(12) United States Patent
Cordani

(10) Patent No.: US 7,992,647 B2
(45) Date of Patent: Aug. 9, 2011

(54) PROCESS AND DEVICE FOR FIRE PREVENTION AND EXTINGUISHING

(75) Inventor: Peter Cordani, Palm Beach Gardens, FL (US)

(73) Assignee: GelTech Solutions, Inc., Jupiter, FL (US)

( * ) Notice: Subject to any disclaimer, the term of this patent is extended or adjusted under 35 U.S.C. 154(b) by 85 days.

(21) Appl. No.: 12/208,891

(22) Filed: Sep. 11, 2008

(65) Prior Publication Data

US 2010/0059237 A1    Mar. 11, 2010

Related U.S. Application Data

(63) Continuation-in-part of application No. 12/282,603, filed on Sep. 11, 2008.

(51) Int. Cl.
*A62C 11/00* (2006.01)
(52) U.S. Cl. ............... 169/30; 169/36; 169/53; 169/54; 239/171; 252/2
(58) Field of Classification Search ............ 169/30, 169/34, 36, 48, 53, 54; 239/302, 171; 252/2
See application file for complete search history.

(56) References Cited

U.S. PATENT DOCUMENTS

| | | | | |
|---|---|---|---|---|
| 4,234,432 A | * | 11/1980 | Tarpley, Jr. ............... 252/2 |
| 4,978,460 A | | 12/1990 | Von Blucher et al. |
| 5,087,513 A | | 2/1992 | Kim |
| 5,190,110 A | | 3/1993 | Von Blucher et al. |
| 5,297,847 A | * | 3/1994 | Clark ............... 297/217.1 |
| 5,519,088 A | | 5/1996 | Itoh et al. |
| 5,762,145 A | | 6/1998 | Bennett |
| 5,778,984 A | * | 7/1998 | Suwa ............... 169/36 |
| 5,849,210 A | * | 12/1998 | Pascente et al. ............... 252/2 |
| 5,989,446 A | | 11/1999 | Hicks et al. |
| 6,245,252 B1 | * | 6/2001 | Hicks et al. ............... 252/2 |
| 6,371,384 B1 | | 4/2002 | Garcia |
| 6,372,842 B1 | | 4/2002 | Grisso et al. |
| 6,841,125 B1 | | 1/2005 | Chartier et al. |
| 6,915,861 B2 | | 7/2005 | Goodworth et al. |
| 7,090,029 B2 | * | 8/2006 | Cleary et al. ............... 169/53 |
| 7,169,843 B2 | | 1/2007 | Smith et al. |
| 7,367,361 B2 | | 5/2008 | Steingass |
| 7,614,456 B2 | * | 11/2009 | Twum ............... 169/36 |
| 2005/0150664 A1 | | 7/2005 | Miller et al. |
| 2006/0278412 A1 | | 12/2006 | Hodges et al. |

* cited by examiner

*Primary Examiner* — Steven J Ganey
(74) *Attorney, Agent, or Firm* — McHale & Slavin, P.A.

(57) ABSTRACT

The instant invention relates to a fire extinguishing apparatus. Particularly to an apparatus that includes at least one container that includes a fire retardant gel. The gel is formed from dehydrated superabsorbent polymer and water. The pre filled containers include at least one control valve or frangible portion to release the fire retardant to extinguish the fire.

6 Claims, 15 Drawing Sheets

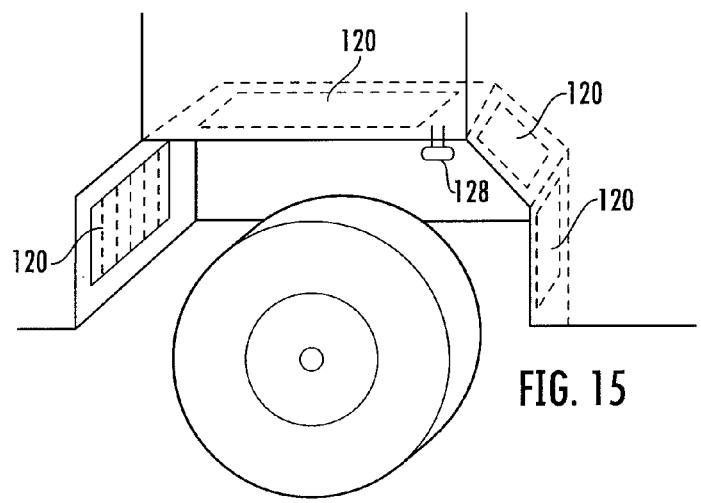
FIG. 15
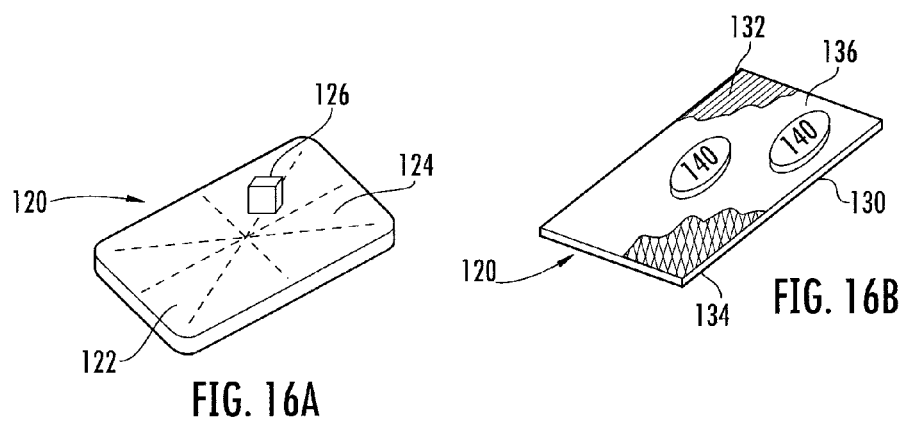
FIG. 16A
FIG. 16B

PROCESS AND DEVICE FOR FIRE PREVENTION AND EXTINGUISHING

FIELD OF THE INVENTION

This invention in a continuation-in-part of application Ser. No. 12/282,603 filed Sep. 11, 2008, entitled Process and device for fire prevention and extinguishing. The present invention relates to apparatus and a process for preventing and extinguishing fires; particularly to a process capable of adding a dehydrated super absorbent polymer to water in an amount sufficient to extinguish and prevent conflagrations.

BACKGROUND OF THE INVENTION

Water has been known for millennia for its fire retardant and extinguishing properties and remains the predominate material used to extinguish or prevent certain types of fires. Water has a high heat capacity and high heat of vaporization, such that when water is sprayed onto a fire, the water that reaches the flames absorbs the heat of the fire and cools the article to below its combustion temperature. Water also deprives the fire of oxygen. Often the heat of the fire turns a portion of water into vapor before it can reach the flames. Since water vapor is heavier than air it displaces the oxygen surrounding the fire, thereby suffocating the fire.

A significant disadvantage often encountered using water to extinguish a fire is that much of the water ends up being wasted. Most of the water applied directly to the fire is turned into steam and evaporates before it can reach the base of the fire, where the combustible fuel for the fire resides. As much as 90 to 95% of the water that does manage to reach the flames simply runs off into the ground without remaining on the structure that is burning. Moreover, considerable effort must be made to continuously soak objects with water near the fire that could ignite. The evaporated and runoff water must be constantly replaced.

U.S. Pat. No. 5,989,446 discloses a water additive for use in fire extinguishing and prevention. The additive comprises a cross-linked water-swellable polymer in a water/oil emulsion that is produced by an inverse phase polymerization reaction. The polymer particles are dispersed in an oil emulsion wherein the polymer particles are contained within discrete water "droplets" within the oil. With the help of an emulsifier, the water "droplets" are dispersed relatively evenly throughout the water/oil emulsion. This allows the additive to be introduced to the water supply in a liquid form, such that it can be easily educted with standard firefighting equipment. However, it has been observed that when this additive is placed in fire extinguishers which utilize a container of water, the mixture requires agitation every 15 days to prevent the polymer from settling out. Another problem with this additive is that it takes approximately 3-4 hours to "cure" such that it is able to absorb a sufficient amount of water and attain the viscosity necessary to adhere to vertical and horizontal surfaces for firefight purposes. Also, if the additive/water mixture is not completely flushed from a hose or nozzle after use, it will harden upon drying out and render the hose or nozzle useless.

U.S. Pat. No. 7,090,029 discloses a method and apparatus for dropping fire retardant from an aircraft. A firefighting bomblet includes a container having rigid supportive walls that together define a faceted-sphere shape. The bomblet can further include a weak seam formed in one of the walls, the weak seam being adapted to be more easily ruptured than the remainder of the walls. Water and water based fire retardants are ideal for use with the bomblet.

U.S. Published Patent Application 2006/0278412 discloses a vehicle having a tire fire suppression system. The fire suppression system includes a container of fire suppressant and at least one temperature sensor in close proximity to at least one of the tires. At least one nozzle is positioned to direct the suppressant to the tire. An actuator connects the container to the nozzle for the suppressant to be dispersed from the nozzle in response to activation of the sensor. In the preferred embodiment, the cylinder contains from 5 to 25 pounds of dry chemical fire suppressant material.

U.S. Pat. No. 5,762,145 discloses a panel mounted on the exterior surface of a vehicle fuel tank. The panel is either channeled or unchanneled with extinguishant sealed therein. When the vehicle is impacted in an accident, the resultant impact deforms the fuel tank and the panel is also ruptured and releases the extinguishant. This is intended to extinguish fires or inert against potential fires in the vicinity of the fuel tank.

U.S. Pat. No. 6,915,861 discloses a system for packaging fire suppressing material. An outer membrane is configured to support and release a fire suppression material when impacted by a ballistic or incendiary round. An inner membrane is configured is configured to support and release the fire suppressant material when impacted by a ballistic or incendiary round and the inner membrane and the outer membrane is connected to form at least one cell holding the fire suppression material. The inner and outer membranes suitably form a bubble pack filled with a fire suppression powder. Further, the inner and outer membranes may be combined with a lightweight honeycomb panel to form a lightweight and simple system to support fuel tanks.

Sometimes, water must be supplied to remote locations, such as during a forest fire, often exhausting considerable physical and monetary expense. Therefore, it imperative that the fire extinguishing properties of water be optimized to reduce the amount time, effort, and cost associated with fighting fires in remote locations.

Thus, what is lacking in the art is an ability to increase the effectiveness of water for fire fighting.

SUMMARY OF THE INVENTION

The instant invention discloses a process for retarding or extinguishing conflagrations using a super absorbent polymer in water. The reaction of the water with the polymer creates a gel-like substance with a viscosity that allows the mixture to be readily pumped through standard eduction equipment, yet viscous enough to cover and adhere to vertical and horizontal surfaces of structures to act as barrier to prevent fire from damaging such structures, minimizing the manpower and water supply needed to continuously soak these structures.

The super absorbent polymer is capable of absorbing water up to several thousands times its own weight. These super absorbent polymers are prepared from water-soluble polymers, but have cross-linking structures that render the polymers water-insoluble. By taking water-soluble ethylenically unsaturated monomers which readily undergo vinyl polymerization, such as acrylamide, with cross-linking agents, a polymer can be produced that is of uniform small size, has a high gel capacity, is highly insoluble, but highly water-swellable (i.e., super absorbent polymer). The gel capacity refers to the property of the water-swollen polymer to resist viscosity changes as a result of mechanical working or milling.

The super absorbent polymers can be dehydrated to a powder. When the powder is added to an aqueous solution and agitated, a super absorbent gel-like substance is formed. In a dry state the preferred polymer may be considered a particle having a diameter less than 4000 microns but greater than 50 microns. In a swollen state the particle may have a diameter greater than three hundred times its weight (more surface area). In a totally water-swollen state, the particles contain up to 99.98 weight percent of water and as little as about 0.1 weight percent of polymer. Thus, such particles could hold an amount of water from ten to thousands of times their own weight.

Without wishing to be bound to any particular theory it is believed that the since the polymer particles are capable of absorbing water in significant quantities relative to its own weight, the water-swollen gel provides a greater water laden surface area, with a higher heat capacity, than the unbound water molecule. Thus, more water actually reaches the fire without being evaporated and provides more cooling. Thus, the fire is extinguished using less water.

By way of example, it is well known that fire extinguishers can be filled with water or dry powders. As stated herein, water is extremely effective fire fighting composition and used in many buildings where conventional commercial enterprises take place. In fact, statistics indicate that around 90% of all fires are extinguished by the use of the conventional cylinders that employ a simple water mixture. The use of the polymer of the instant invention can be placed within a cylinder, added to the stream by use of an inductor, or be incorporated into a nozzle line by use of an in-line saturation device. As will be described later in this application, the amount of polymer is minuscule for the proper effectiveness. For instance, a typical cylinder which contains approximately 2.5 gallons of water would use approximately three ounces of the polymer. The polymer can be added directly added to the water stored within the cylinder to allow for full saturation of the polymer before dispensing. Dispensing mechanisms need not be changed as the polymer, when absorbed with liquid, forms a near liquid state and will not cause clogging of valves, even on small cylinders. Alternatively, use of an inductor attached to the nozzle allows the polymer to be drawn in as the fluid is dispensed, or as previously mentioned, an in-line saturator simply causes the nozzle to engage the polymer which disperses the appropriate amount. It should be noted that once the polymer has been dispensed, it is readily acceptable to absorb water from ancillary sources, such as other cylinders that are dispensing water, all of which helps maintains the moisture near the base of the fire.

Another example would be the use of a mobile fire truck which can contain a large volume of water in a holding tank, the polymer can be mixed directly into the holding tank. Alternatively, the polymer can be added by use of an eductor or an in-line pump, both of which react to the amount of water passing through a fire hose. The use of an in-line pump or an eductor further provides a continuous use of polymer when a fire hydrant is the primary source of water replenishment or when a water pickup is used in a river, pond, lake or any other source necessary to replenish the water supply.

In the example of a conventional fire hydrant wherein a fireman couples a fire hose for the dispensing of water directly onto the fire, the use of an eductor or in-line pump each provide a method of inserting the proper amount of polymer to effectuate higher retention and wetability of the water.

Yet another example is the use in commercial buildings, especially in those instances where highly combustible materials are stored. For instance, home improvement centers are known to carry paints, glues, caulks, and other materials that will become fuel to a fire once containers are ruptured or the contents otherwise exposed. In such instances, extinguishing must be immediate and thus there is a need for high wetability. In commercial buildings, the use of various additives are employed mainly to prevent corroding of the pipes as the water placed within the carrier system could be stagnant for years, if not decades. In such instances, the use of an eductor or in-line pump allows the polymer to be introduced into the distribution system as necessary. Further, devices can be placed right at the point of use or sprinkler distribution point for adding of the polymer. Such applications may be a burst pack which simply powders the room with a super absorbent polymer allowing the sprinkler to then saturate the polymer to provide the aforementioned wetability. Alternatively, the distribution points may each include a small eductor as it is not a requirement that a continuous amount of polymer be added, but rather an appropriate amount which can then be replenished by water. This is particularly helpful where isolated sections may be desirous of a polymer additive, yet it would not be necessary in another building section that may store metal pipe, or other non-combustible materials, where the conventional water sprinkler system is more than sufficient.

It should be noted that the super absorbent polymer and water of the instant invention may create a slippery surface. In such instances, a small amount of grit may be added to the super absorbent polymer if it is to be used in an area that will be traversed by individuals such as exit corridors or where fireman are expected to travel by foot or vehicle.

Yet another example is for use of the instant invention for use in home protection wherein the primary fire extinguishing material is water distributed by a water hose. The most readily available example is during fire season in certain states wherein homeowners are known to stand on their roofs and water down the shingles to stop embers from catching fire. The use of a super absorbent polymer added to the water will allow for distribution by the water hose of a mixture which maintains the water in a ready state of protection on the roof, especially if the roof is constructed from wood shingles. When the homeowner leaves their home as a fire approaches, a water barrier is maintained on the roof, which is sufficient to stop embers, or sparks from igniting the roof that is the leading cause for the home destruction. Further, the homeowner would also use this opportunity to saturate the yard and trees to prevent embers from igniting dry vegetation.

Accordingly, it is an objective of this invention to present a process that uses a combination of super absorbent polymer that transforms water into a fire extinguishing or preventing substance. This super absorbent polymer gel will bring fires under control more quickly, offering substantial water and timesaving.

Yet another objective of the instant invention is to provide a device and process to fight fires that is biodegradable and non-hazardous. In fact, the gel-like substance actually helps the soil recover from fire by maintaining a higher moisture content of the soil for extended periods of time.

Another objective of the instant invention is to teach a composition for fighting fires that can be easily added to, or retrofitted into, standard fire extinguishing systems (e.g., fire hydrant, fire hose, etc).

Still another objective of the instant invention is to teach pre-treating combustibles (e.g., people, foliage, structures) to preventing them from reaching their ignition temperature.

Yet another objective of the present invention is to teach a hydrated super absorbent polymer gel having a viscosity that allows the gel to be dispensed from a container reservoir without blocking the dispensing equipment.

Another objective of the instant invention is to teach a combination of water and super absorbent polymer having sufficient viscosity to enable it to cover vertical and horizontal surfaces.

Still another objective of the present invention is to provide an improved apparatus for delivering a fire retardant gel from an aircraft onto a forest or brush fire.

Yet another objective of the present invention is provide an improved apparatus for delivering a fire retardant gel to the tire's of a vehicle which has been attacked by a fire bomb, improvised explosive device, grenade or the like thereby enabling its occupants to remove the vehicle and themselves from the hostile zone of attack Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE DRAWINGS

FIG. 15 illustrates a fire suppression devices used to prevent or extinguish tire fires by the placement of fire retardant gel within containers mounted on vehicular components adjacent the tires.

FIGS. 16A and 16B illustrate containers that can be attached to the vehicle components.

DETAILED DESCRIPTION

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representative basis for teaching one skilled in the art to various employ the present invention in virtually any appropriately detailed structure.

The present invention relates to a process of retarding or extinguishing conflagrations using a super absorbent polymer in water in an amount sufficient to retard or extinguish the fire. The present invention utilizes biodegradable super absorbent aqueous based polymers, for example, cross-linked modified polyacrylamides, potassium acrylate, polyacrylamides, sodium acrylate commercially available from Stockhausen, Inc. (Greensboro, N.C.). Other suitable polymers include, albeit are not limited to, carboxy-methylcellulose, alginic acid, cross-linked starches, and cross-linked polyaminoacids.

In the present invention, a solid form of the super absorbent polymer, such as powder, is introduced into a standard fire extinguishing system (e.g., canisters, sprinkler system, spray tanks, etc).

Figure 1A:
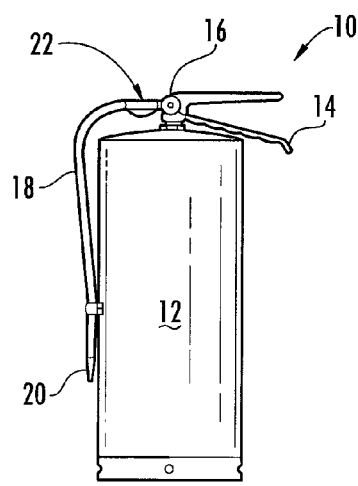
FIG. 1a illustrates a canister that is manufactured with a super absorbent polymer containing cylinder in fluid communication with a flexible hose.
Figure 1B:
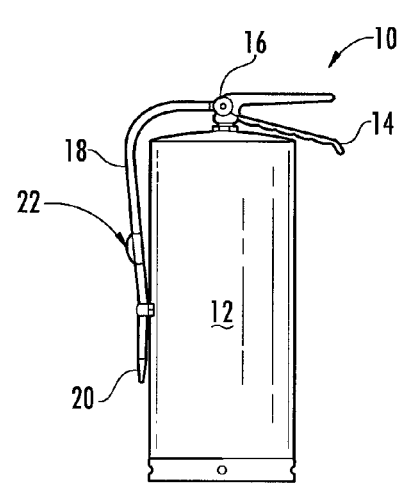
FIG. 1b, illustrates a commercially available canister which has been retrofitted with the super absorbent polymer containing cylinder in fluid communication with the flexible hose.

Referring now to FIGS. 1-7, wherein like elements are numbered consistently throughout, FIGS. 1A and 1B illustrate a conventional hand-held fire extinguisher or water canister (i.e., water bomb) typically used to extinguish smaller fires. The canister 10 comprises a container body 12 which is made of a corrosion resistant material used store a predetermined volume of water therein. The water may be kept under pressure in the container body or pressure may be applied to the water just prior to its use. The user dispenses the water by squeezing lever 14 which opens valve 16 allowing water in the container to flow through a flexible hose 18 and out the nozzle 20. During operation the user will direct the flexible hose and nozzle 20 toward the base of the fire.

FIG. 1A illustrates a canister 10, such as a fire extinguisher, that is manufactured with a reservoir 22 containing dehydrated super absorbent polymer in fluid communication with the interior of the flexible hose adjacent the valve 16. In another embodiment illustrated in FIG. 1B, a commercially available canister 10 is retrofitted with the super absorbent polymer-containing reservoir 22 in fluid communication with the interior of the flexible hose. For example, the reservoir 22 may include a water impermeable membrane constructed and arranged to allow the dried super absorbent polymer to be drawn there from by the negative pressure created by the flow of the water through the hose 18 past the reservoir 22 when the valve 16 is opened. The polymer will then effectively swell with water prior to being presented to the fire. Surfaces that have not been affected by the fire can also be coated with the water, polymer mixture to prevent these surfaces from catching on fire.

EXAMPLE

A non-limiting illustrative example is presented herein; the following is only an example and not solely representative of the inventive concepts discussed herein.

To a 2.5 gallon canister approximately 3 tablespoons of a superabsorbent aqueous based polymer was added and shaken vigorously for approximately 30 seconds. Within a few seconds the polymer obtained over 70% of its absorption capacity or nearly three hundred times its weight with water. The viscosity was such that the gel was able to be sprayed about 40 ft. and effectively cover most vertical and horizontal surfaces for an extended period of time. Moreover, the viscosity did not cause the polymer to aggregate or prevent education through the hose of the canister.

Figure 2:
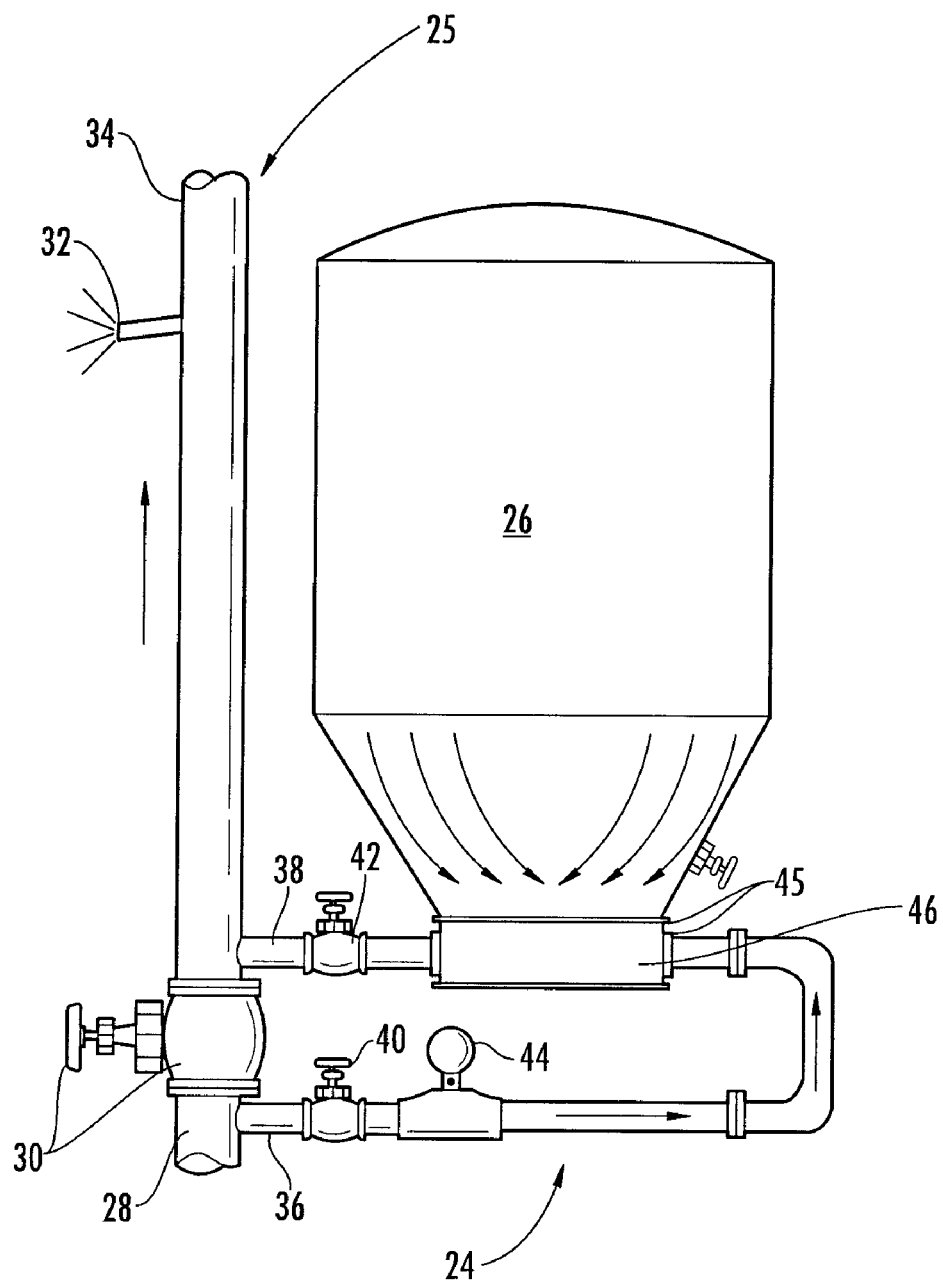
FIG. 2 illustrates another embodiment of the present invention wherein a cylinder containing a super absorbent polymer is incorporated into a building sprinkling system.

FIG. 2 illustrates a bypass system 24 that may be inserted inline with a conventional building sprinkler system or fire suppression system 25. A cylinder 26 contains a dehydrated form of the super absorbent polymer. The cylinder could also contain the superabsorbent polymer already saturated with water, in a gel form, whereby the gel has a viscosity that allows it to remain flowable throughout the system, including restricted dispensing orifices found in conventional sprinkler heads 32.

The fire suppression system shown in FIG. 2 includes a water inlet pipe 28 in fluid communication with a water source (not shown). The water source may be a municipal water system. The fire suppression system may also employ a pump or pumps if the water pressure from the municipal water system is insufficient to supply water to the entire fire suppression system at the required pressures. The fire suppression system includes a valve 30 located inline in the fire suppression system which includes at least one sprinkler head 32 and outlet portion 34 to regulate flow of water there through. Preferably, the sprinkler head 32 is disposed over areas where fire suppression is desired. The polymer-containing cylinder 26 is shown here connected to the existing fire suppression system by a bypass loop 24. The bypass loop includes a bypass pipe inlet 36 connected upstream of the valve 30. An inlet valve 40 connected downstream of pipe 36. A pressure gauge 44 connected downstream of the inlet valve 40. A bypass outlet 38 pipe with an outlet valve 42 connected upstream of the outlet pipe 38. The outlet pipe is connected to the fire suppression system 25 downstream of the valve 30.

The bypass system 24 with attached cylinder 26 is operational when the valve 30 is closed and the valves 40 and 42 are opened. Thus, when the fire suppression system is triggered (such as by a fire), water will flow from the inlet pipe 28 to the bypass inlet 36 through the bypass outlet 38 and out of the sprinklers 32 to quench the fire. Conversely, the bypass loop may be avoided if valve 30 is opened and valves 40 and 42 are closed.

As with the previous embodiment, the cylinder may include a water impermeable membrane 45 located between the dehydrated polymer cylinder 26 and the bypass loop constructed and arranged to allow the dried polymer to be drawn into a mixing area 46 by the negative pressure created by the flow of the water through the loop. In an alternative embodiment the cylinder 26 may contain a flowable water-laden gel, formed by the combination of the dehydrated super absorbent polymer and water, which is drawn into the mixing area by the flow of water past the cylinder 26. The bypass system 24 may be retrofit into an existing fire suppression system or installed during the construction phase of the building.

Figure 3:
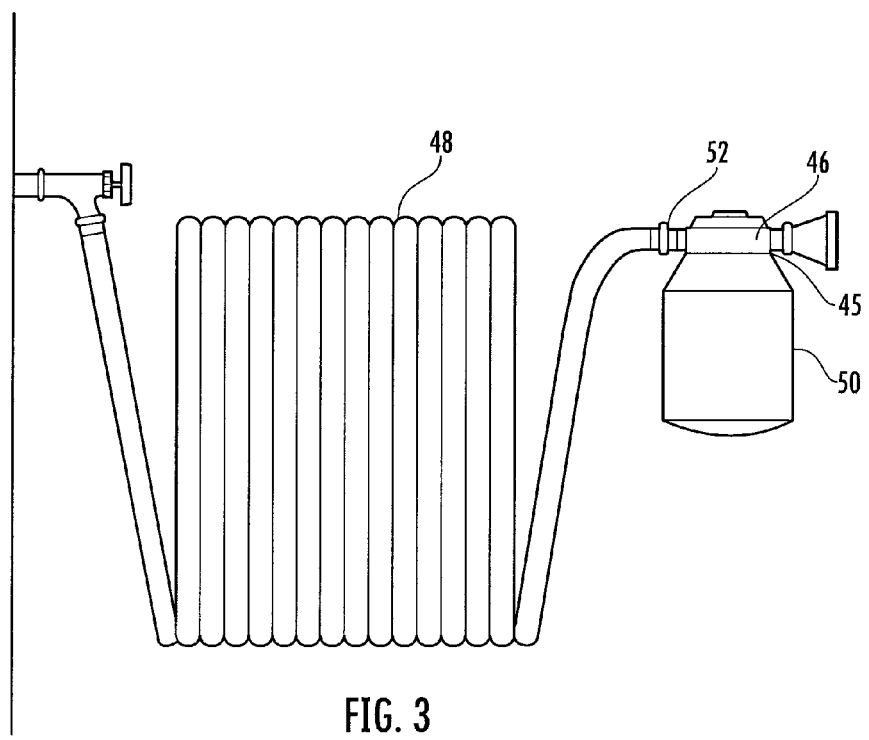
FIG. 3. illustrates another embodiment of a cylinder containing a super absorbent polymer shown attached to the threaded end of a standard garden hose.

FIG. 3 illustrates another embodiment where a cylinder 50, containing the dehydrated super absorbent polymer or water-laden gel formed from the super absorbent polymer, is removably attached to the threaded end 52 of a conventional garden hose 48. This combination may be used to extinguish outdoor fires. A water impermeable membrane 45 located between the dehydrated polymer cylinder 50 and the garden hose 48. In addition, cylinder 50 may contain a flowable water-laden gel, formed by the combination of the dehydrated super absorbent polymer and water, which is drawn into the mixing area 46 by the flow of water past the cylinder.

Figure 4:
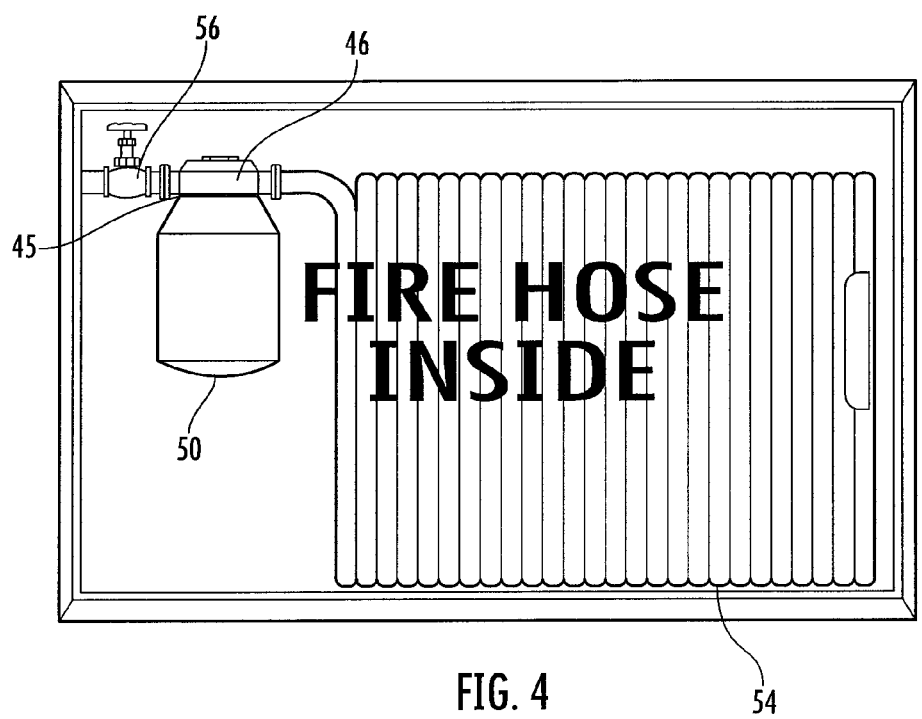
FIG. 4. illustrates a cylinder containing the super absorbent polymer attached to a standard emergency indoor fire hose.

Similarly, FIG. 4. illustrates the cylinder 50 containing the dehydrated super absorbent polymer or water-laden gel formed from the super absorbent polymer in fluid communication with an emergency indoor fire hose 54 commonly found in buildings to extinguish indoor fires. Water is supplied to the fire hose from a municipal water system. Pumps may be employed to raise the pressure of the water in a building, if necessary, prior to the fire hose. In this embodiment the cylinder 50 containing the super absorbent polymer is located between a valve 56, which is normally employed to control the flow of water to the fire hose 54, and the fire hose 54. In the event of a fire, the fire hose 54 is removed from its storage housing and carried to the fire. The valve 56 is then opened allowing water to flow through the cylinder 50 and hose 54. The cylinder 50 may contain the dehydrated super absorbent polymer or water-laden gel formed from the super absorbent polymer. A water impermeable membrane 45 located between the dehydrated polymer cylinder 50 and the fire hose 54 permits the flow of water to draw the polymer into the water stream. In addition, cylinder 50 may contain a flowable water-laden gel, formed by the combination of the dehydrated super absorbent polymer and water, which is drawn into the mixing area 46 by the flow of water past the cylinder.

Figure 5:
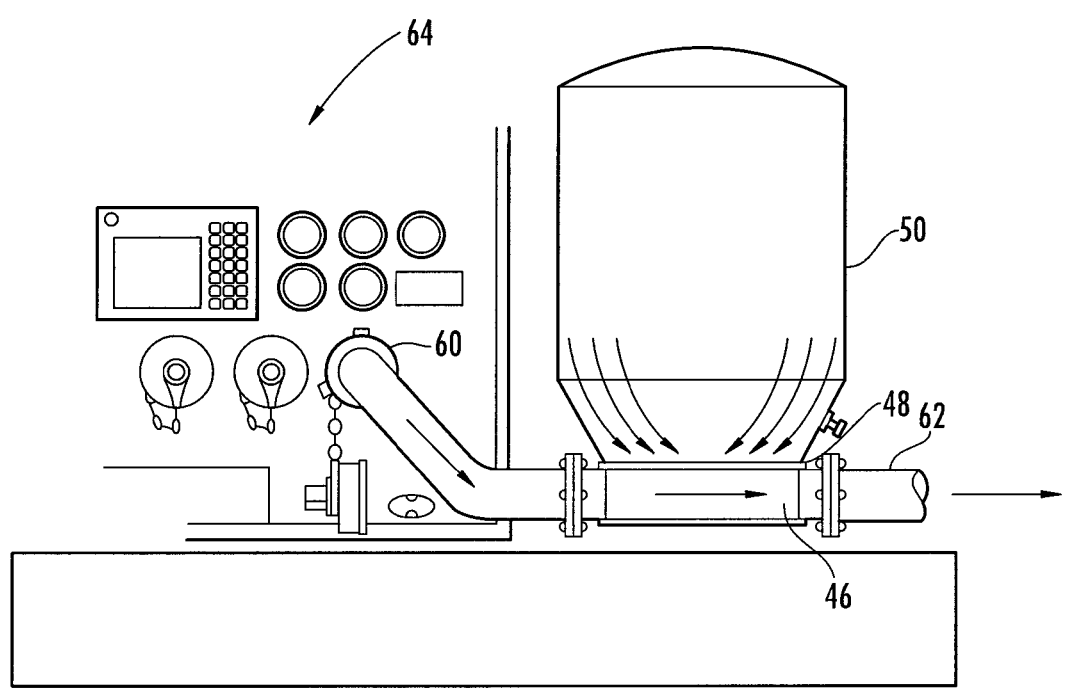
FIG. 5. illustrates a cylinder containing the super absorbent polymer attached to the water outlet port of an emergency fire vehicle.

FIG. 5 illustrates the cylinder 50 containing the dehydrated super absorbent polymer or water-laden gel formed from the super absorbent polymer is attached a fire hose 62 which is, in turn, attached to one of the water outlet ports 60 of a fire vehicle 64. The vehicle can be, but is not limited to, trucks (tankers, pumpers, brush buster, etc.), boats, planes, helicopters and fire buggies. A pump is conventionally located on the vehicle and supplies water from a source or tank 65 (FIG. 7) to outlet 60 at a pressure. The cylinder may be located at any point between the source of water and the outlet of the hose. For example, the cylinder may be attached directly to the outlet port 60 or at the fire hose nozzle (not shown) by any conventional means of attachment known to those having skill in the art. A water impermeable membrane 45 located between the dehydrated polymer cylinder 50 and the fire hose 62 permits the flow of water to draw the polymer into the water stream. In addition, cylinder 50 may contain a flowable water-laden gel, formed by the combination of the dehydrated super absorbent polymer and water, which is drawn into the mixing area 46 by the flow of water past the cylinder.

Figure 6:
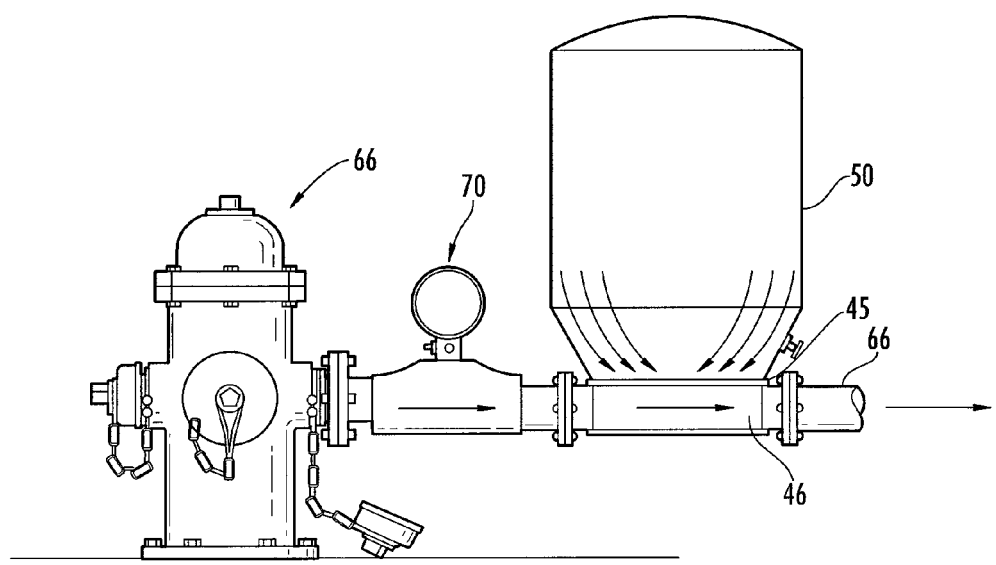
FIG. 6. illustrates a cylinder containing the super absorbent polymer attached to a standard fire hydrant.
Figure 7:
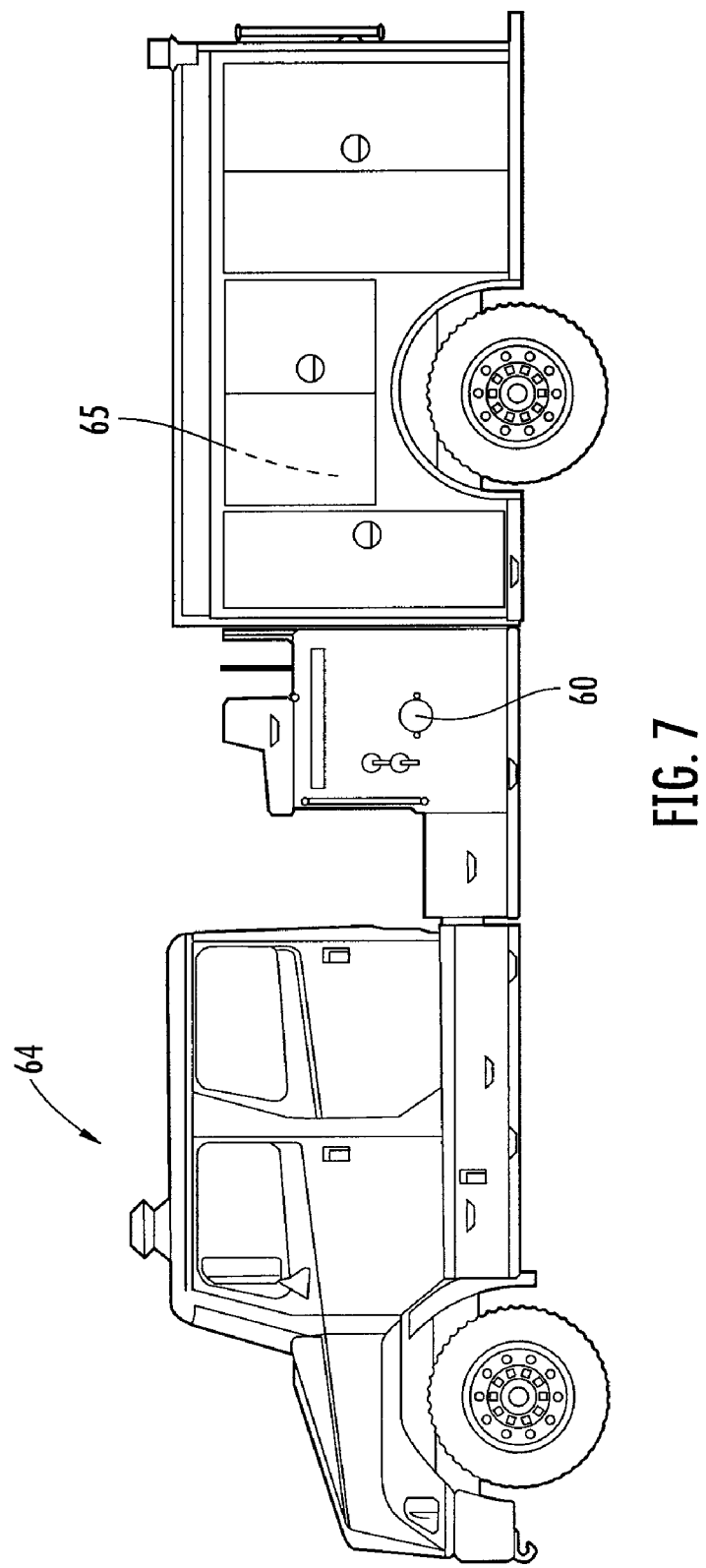
FIG. 7 illustrates a pumper type of fire truck which carries a supply of water.

In a further embodiment, illustrated in FIG. 6, the cylinder 50 containing the dehydrated super absorbent polymer or water-laden gel formed from the super absorbent polymer may be attached to a standard fire hydrant 66 with fire hose 68. A pressure gauge 70 could be placed inline between to fire hydrant 66 and cylinder 50 to monitor the pressure of the water exiting from the fire hydrant. The water pressure can be controlled at the fire hydrant if desired. As with the previous embodiments, the cylinders 50 of FIGS. 5 and 6 may include dehydrated polymer with water impermeable membrane or the polymer in gel form. A water impermeable membrane 45 located between the dehydrated polymer cylinder 50 and the fire hose 66 permits the flow of water to draw the dehydrated polymer into the water stream. In addition, cylinder 50 may contain a flowable water-laden gel, formed by the combination of the dehydrated super absorbent polymer and water, which is drawn into the mixing area 46 by the flow of water past the cylinder.

It is hereby contemplated that any of the aforementioned cylinders or canisters may be of any size or shape deemed necessary to accommodate various needs and/or applications.

Figure 8:
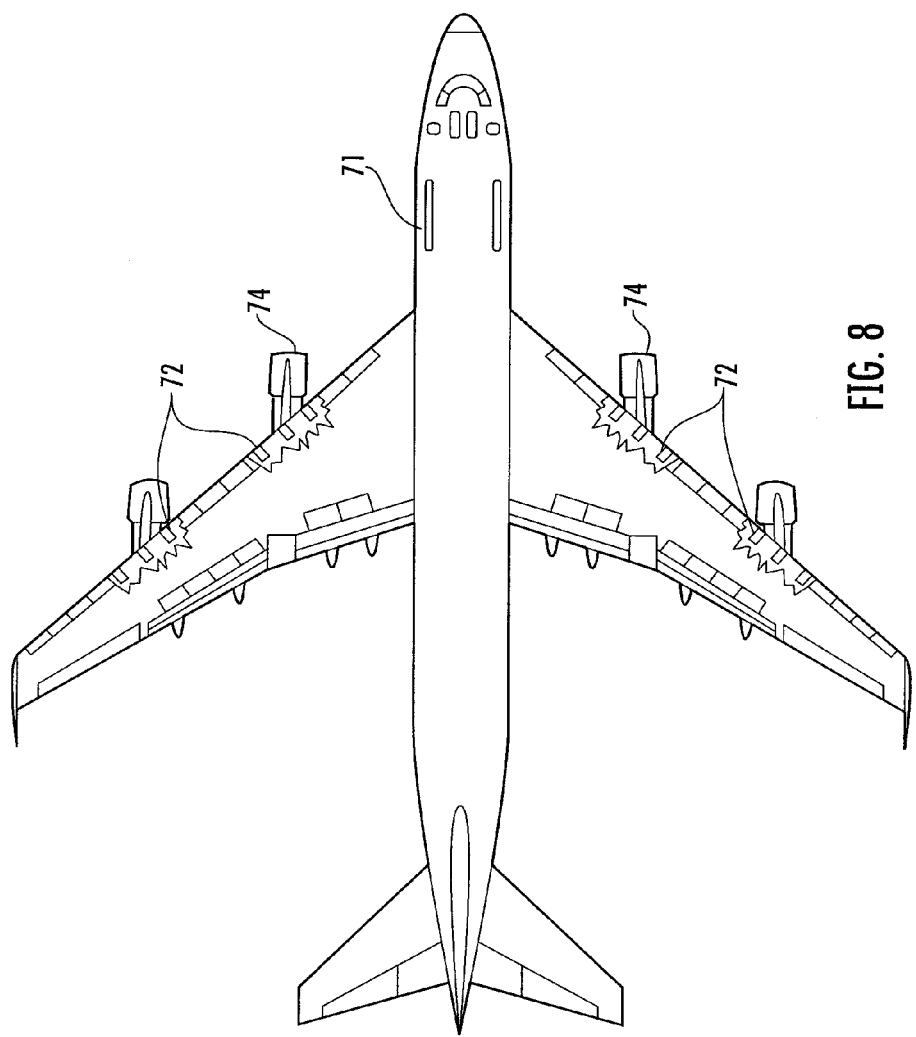
FIG. 8 illustrates a fire suppression system on an aircraft.
Figure 9:
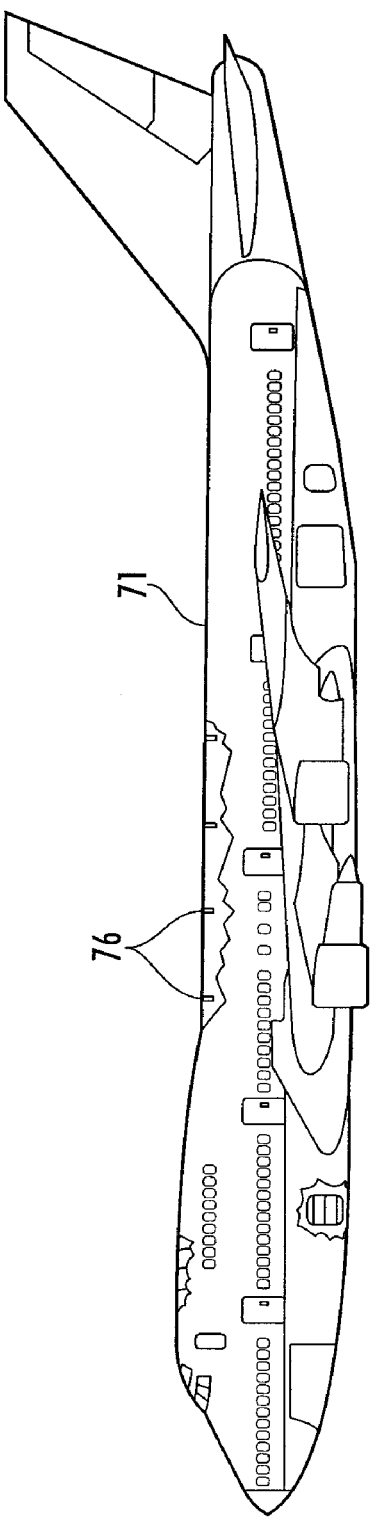
FIG. 9 illustrates a fire suppression system for the interior of an aircraft.

In another embodiment, illustrated in FIGS. 8 and 9 the present invention could be employed in a fire suppression system currently utilized in aircraft 71. An example of this type of fire suppression system is illustrated in FIG. 2. The fire suppression system may employ a dehydrated super absorbent polymer stored in a cylinder or a water-laden gel stored in a cylinder similar to the fire suppression system illustrated in FIG. 2. Nozzles 72 are utilized to deliver a water-laden gel mixture to aircraft engines 74 which may have caught on fire. In addition nozzles 76 are used to deliver the water-laden gel mixture to the interior of the aircraft to extinguish any fires that may have erupted within the aircraft. Pumps may be employed to deliver the water from a storage tank (not shown) to the nozzles.

Figure 10:
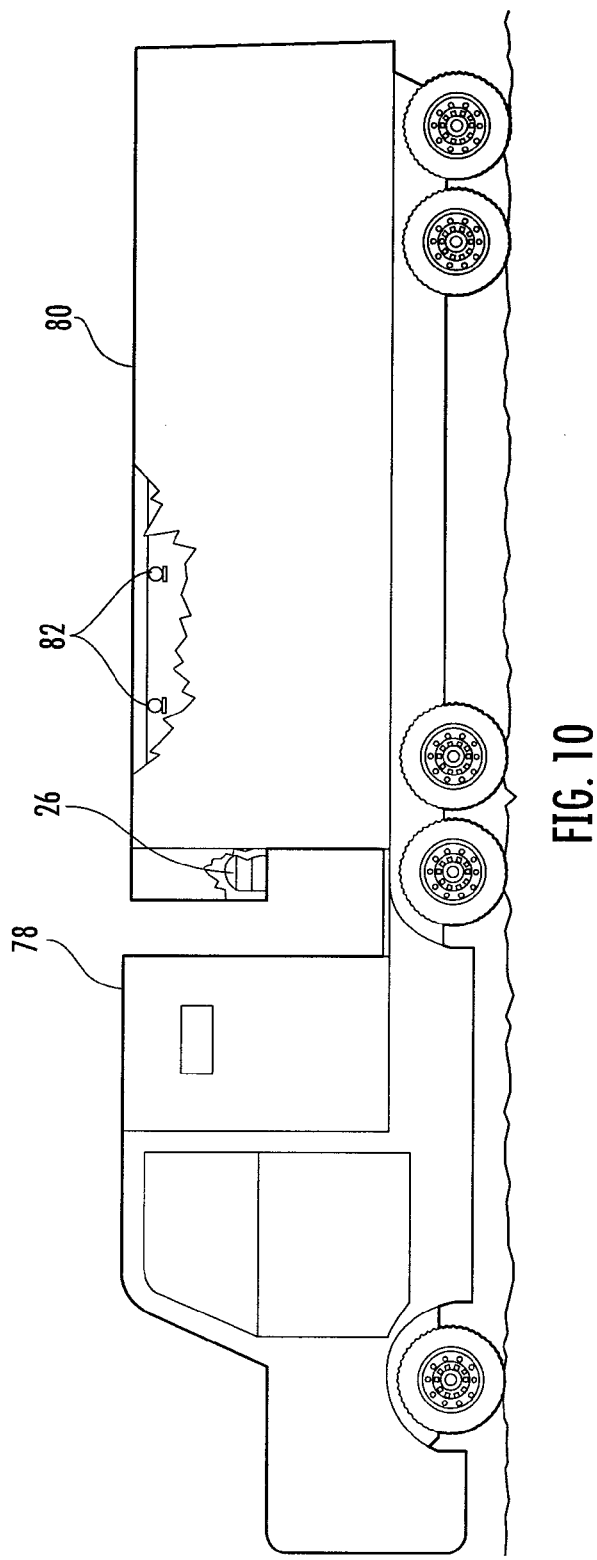
FIG. 10 illustrates a fire suppression system on a tractor-trailer vehicle.

FIG. 10 illustrates another embodiment of the present invention utilized to extinguish or suppress fires on vehicles. A tractor-trailer is formed with a tractor portion 78 and a trailer portion 80. The fire suppression system is located in the trailer portion where the likelihood of a fire is the greatest. A plurality of nozzles 82 are located in the upper portion of the trailer to deliver a mixture of water-laden gel and water from an onboard tank to the contents of the trailer to extinguish any fires that may have erupted therein. The fire suppression system is similar to the one illustrated in FIG. 2. The container 26 which holds the dehydrated super absorbent polymer or water-laden gel is shown as being located in the forward section of the trailer. However, any other location would also be suitable. Pumps may be employed to deliver the water form the onboard tank to the nozzles 82.

Figure 11:
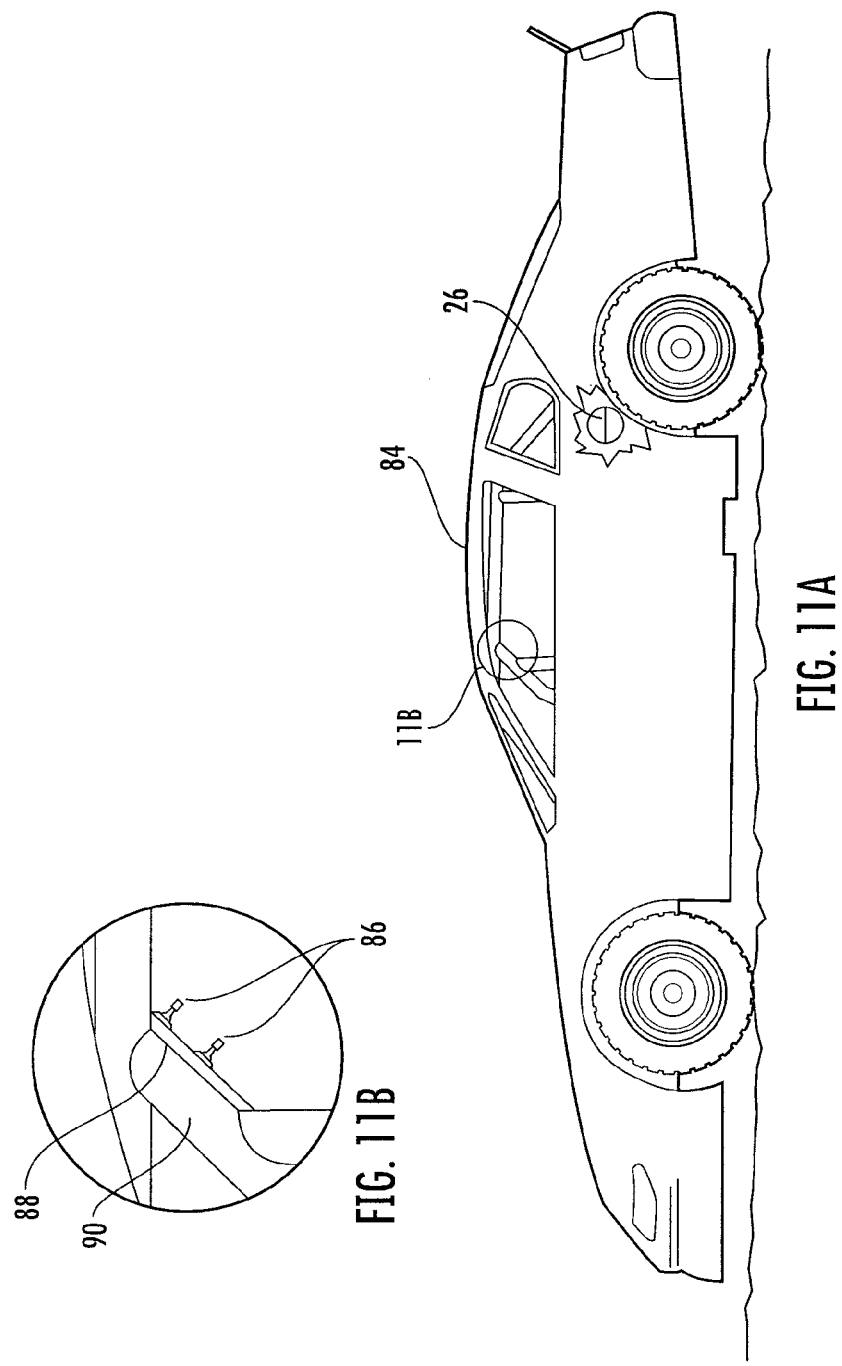
FIGS. 11A and 11B illustrate a fire suppression system on an automobile.

Another embodiment of the present invention designed for use in vehicles is illustrated in FIGS. 11A and 11B. An automobile or race vehicle 84 is shown in FIG. 11A. A fire suppression system, similar to the system illustrated in FIG. 2, is located within the vehicle. A tank 26 which holds the dehydrated super absorbent polymer or a water-laden gel. The location of tank 26 is for illustrative purposes. Any other location is also possible. The water-laden gel mixture is delivered to nozzles 86 through piping connected to the tank 26 and a supply of water, for example an onboard tank. Pumps may be employed to deliver the water from the supply to the nozzles 86. A preferred, albeit non-limiting, location for the nozzles is on the roll cage 90 of the vehicle. This type of fire suppression system is extremely useful in race vehicles, especially those which are not constructed to strict NASCAR standards.

Figure 12:
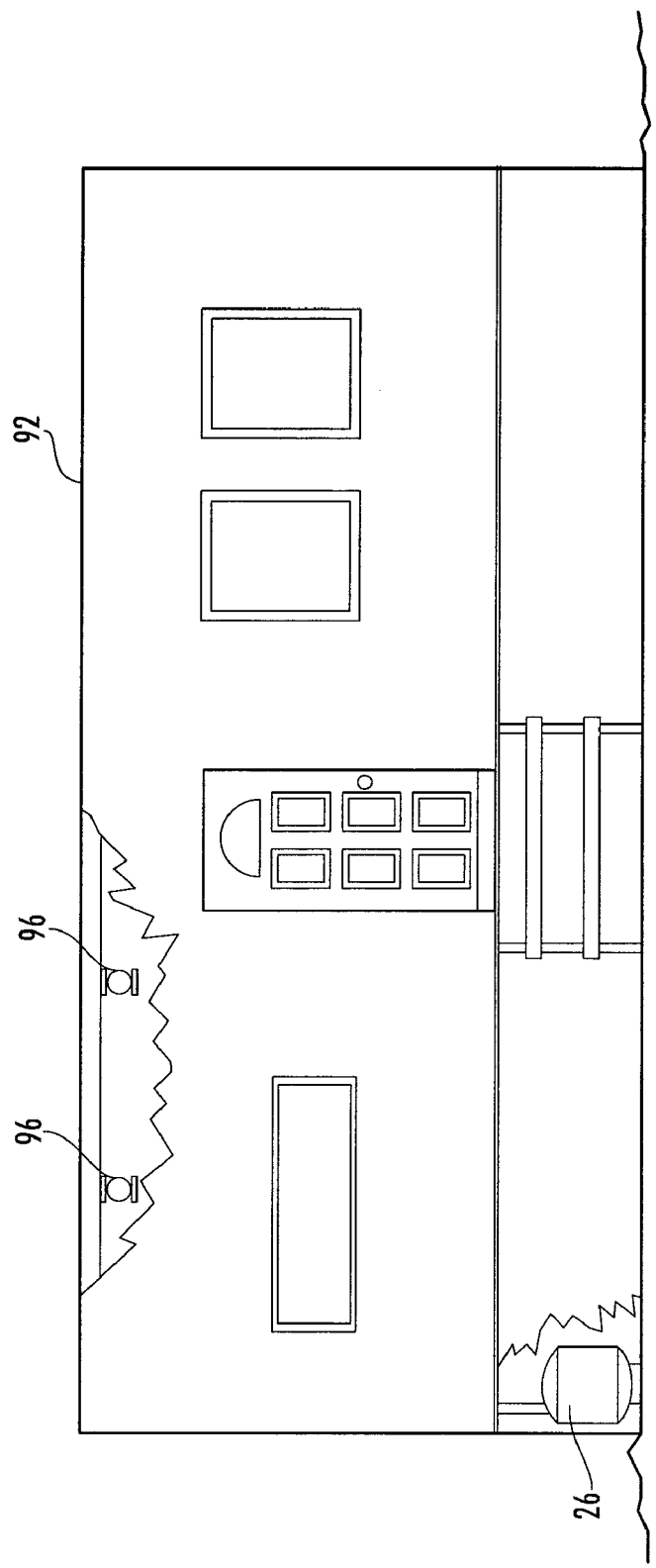
FIG. 12 illustrates a fire suppression system in a mobile home or prefabricated building.

Another embodiment of the present invention is illustrated in FIG. 12 as a fire suppression or sprinkler system for mobile or prefabricated buildings 92. A tank 26 which holds the dehydrated super absorbent polymer or a water-laden gel. The location of tank 26 is for illustrative purposes. Any other location is also possible. The water-laden gel mixture is delivered to nozzles 96 through piping connected to the tank 26 and a supply of water. The water supply can be a municipal water supply or a storage tank. Pumps may be employed to deliver the water from the supply to the nozzles 96. Water-laden gel mixture from cylinder 26 is delivered through piping (not shown) to nozzles or sprinklers 96 located in the upper portions of the buildings 92 and directed onto a fire. The fire suppression system or sprinkler system would function in a manner similar to that illustrated in the embodiment of FIG. 2.

Figure 13:
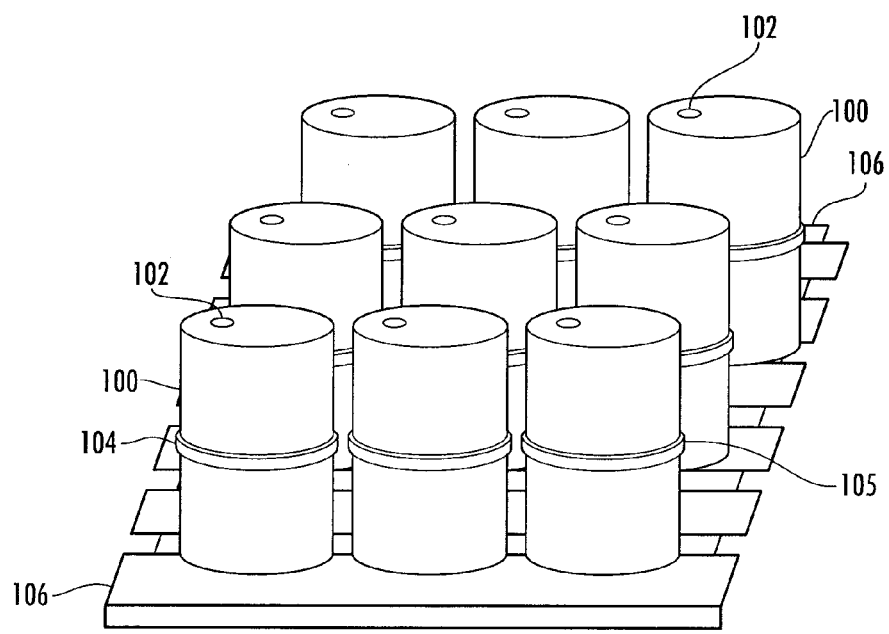
FIG. 13 illustrates a fire suppression system for extinguishing ground fires from the air by dropping frangible containers from an aircraft.

Other uses of the water-laden gel mixture include dispensing it from aircraft, supertanker aircraft and helicopters as a fire suppressant to control forest fires and other large fires. The water-laden gel could also be utilized as a fire break. As shown in FIG. 13 the super absorbent fire retardant polymer is loaded into aerial bomb-like containers 100 by filling through a resealable inlet 102. By way of example, each container will hold approximately fifty pounds of fire retardant gel.

The aircraft could be fixed wing type, helicopter type, or lighter than air type aircraft. To ensure adequate dispersion of the fire retardant each container includes one or more weakened or frangible portions 104 such as, but not limited to, score lines, thinned out wall sections, and various geometric configurations, that will result in the optimum release of the fire retardant. The geometric configuration could take the shape of a flange 105 that extends outwardly from the external surface of the container. The flange may extend completely around the container. The flange is at its base is part of or connected to a frangible portion of the container. As the container is falling the force of the air resistance will exert a bending and breaking force on the flange and rupture the container. The containers are designed to rupture when subjected to sufficient force created by air resistance as the containers are falling and or upon impact with the ground. Once filled the containers are stacked on pallet 106 and shrink wrapped into position for easy storage, transportation, loading and subsequent payload release from the aircraft. The containers can be made from a biodegradable polymer or any other suitable material. The pallet 106 are likewise made from biodegradable material. In practice one or more pallet will be dropped from the aircraft. Upon hitting the air resistance the shrink wrap is designed to tear away from the palate thereby releasing the individual containers 100. The containers 100 are likewise designed to break open at their frangible portions 104 due to the force of the air resistance. Alternatively the container 100 and frangible element 104 can be designed to break open only upon impact with the ground.

Figure 14:
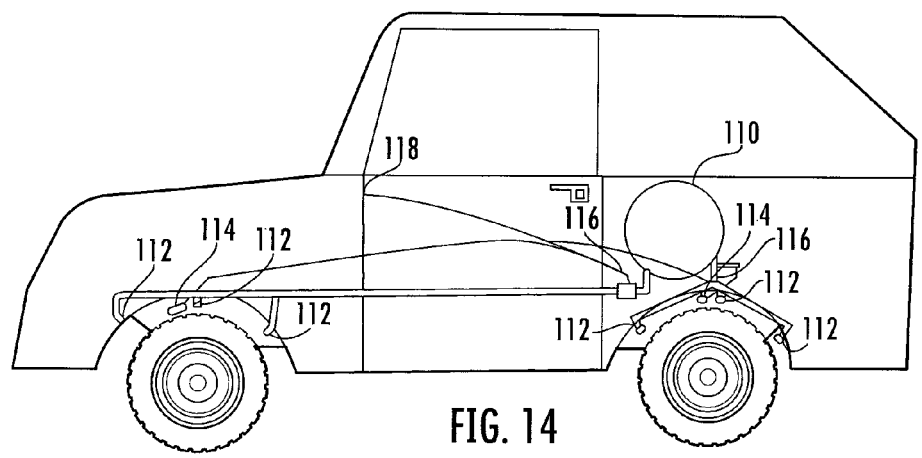
FIG. 14 illustrates a fire protection system for a military or a first responder type vehicle designed to prevent or extinguish tire fires caused by fire bombs or other hostile attacks.

FIG. 14 illustrates a fire protection system for a military or a first responder type vehicle. Military vehicles in combat zones or first responders, such as police, fire, and National Guard, in areas of civil insurrection often find themselves subject to attack by fire bombs, improvised explosive devices and the like. Often these insurgent attacks result in vehicular fires wherein the vehicle's tires themselves combust thereby increasing the intensity and sustainability of the ensuing inferno. Should the occupant's exit the vehicle to extinguish the fire or attempt to abandon the vehicle they would present themselves as easy targets to the insurgents in the zone of hostility. It is therefore essential to provide these vehicles with a system to enable the occupant's to extinguish the fire from within the vehicle. In this embodiment fire retardant gel of superabsorbant polymer and water is held in a container 110 within the vehicle, preferably in an area that is well protected within the vehicle. Located in an area adjacent each tire is one or more spray nozzles 112 that are in fluid communication with the container. One or more fire sensors 114 are located about each tire on the vehicle. The contents of the container are under pressure. When the fire sensor 114 is triggered by the presence of fire, a valve 116 element will automatically release the fire retardant gel and dispense it through the nozzle(s) to extinguish the fire. In addition, a manual actuator 118, such as an electric switch, for the valve element can be located within the vehicle compartment should that be necessary.

FIG. 15 illustrates an alternative vehicle tire extinguishing system. In this embodiment the vehicular body panels and in particular the wheel wells, tire hub, fenders, etc include a chamber 120 designed to contain fire retardant gel. The panels will be installed in areas adjacent each tire on the vehicle. The chamber 120, as shown in FIG. 16A, includes a ruptureable bladder with flexible walls so as to conform to the body component to which it is attached. The bladders include one or more frangible elements 124 designed to break either upon the impact of sufficient force or melt away upon reaching a predetermined temperature, such as that indicative of a tire fire. The frangible elements can also include electrically activated frangible elements. These electrically activated frangible elements 126 can be small explosive type actuators, thermal actuators, electric solenoid piercing type actuators, etc. and can be manually and/or automatically activated. The automatic sensors 128 would include thermal sensors, accelerometers, vibration sensors, etc. The contents of the bladders are held under sufficient pressure to ensure its rapid release. The pressure is created either by the quantity fire retardant gel contained within the resilient bladder or by pressurizing the bladder with an inert gas or by mechanical pressurization. FIG. 15B illustrates an embodiment wherein the chamber 120 is formed as a container 130 with rigid walls 136. The interior of the container can be hollow and is filled with fire retardant gel. FIG. 16b shows the interior of the container in partial section which may include channels 132 or honeycomb structures 134 therein to provide structural stability to the container. All or a portion of a container wall is design to be frangible so as to appropriately release the fire retardant. The walls 136 can be explosively removed as in the manner disclosed in U.S. Pat. No. 7,341,113 or thermally destroyed either by the heat of the fire itself, the concussion of the bomb or projectile or by one or more activators 140 initiated by an automatic and/or manual actuator.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention. Although the invention has been described in connection with specific preferred embodiments, it should be understood that the invention should not be unduly limited to such specific embodiments.

What is claimed is:

1. A fire extinguishing apparatus comprising at least one container, said container including a resealable inlet and at least one flange extending outwardly along an external surface of said container, said flange connected to a frangible portion, said container filled with water having dispersed therein particles of a polymeric material; said polymeric material is a dehydrated super absorbent polymer selected from the group consisting of cross-linked modified polyacrylamides, potassium acrylate, and polyacrylamides, said polymeric material being present in an amount sufficient to increase the viscosity of the water to enable the water to adhere to horizontal and vertical surfaces in an amount sufficient to suppress combustion on said horizontal and vertical surfaces wherein when falling a force of air resistance is adapted to exert a bending and breaking force on the flange and rupture the container at least one along the frangible portion.

2. The fire extinguishing apparatus of claim 1 wherein the frangible portion includes a score line.

3. The fire extinguishing apparatus of claim 1 wherein the frangible portion includes a thinned out wall section.

4. The fire extinguishing apparatus of claim 1 wherein a plurality of filled containers are prepackaged on a pallet for easy storage, transportation, loading and subsequent payload release from an aircraft.

5. The fire extinguishing apparatus of claim 4 wherein the plurality of containers and pallet are made from biodegradable material polymer.

6. The fire extinguishing apparatus of claim 1 wherein at least one container is made from a biodegradable polymer.

* * * * *